US009263026B2

(12) United States Patent
Hofstader et al.

(10) Patent No.: US 9,263,026 B2
(45) Date of Patent: *Feb. 16, 2016

(54) SCREEN READER HAVING CONCURRENT COMMUNICATION OF NON-TEXTUAL INFORMATION

(71) Applicant: Freedom Scientific, Inc., St. Petersburg, FL (US)

(72) Inventors: Christian D. Hofstader, St. Petersburg, FL (US); Glen Gordon, Madison, WI (US); Eric Damery, Odessa, FL (US); Ralph Ocampo, Tarpon Springs, FL (US); David Baker, Portland, OR (US); Joseph K. Stephen, Eden Hills (AU)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,543

(22) Filed: Jul. 11, 2014

(65) Prior Publication Data
US 2014/0324438 A1    Oct. 30, 2014

Related U.S. Application Data

(63) Continuation of application No. 10/710,910, filed on Aug. 12, 2004, now Pat. No. 8,826,137.

(60) Provisional application No. 60/496,057, filed on Aug. 14, 2003.

(51) Int. Cl.
*G10L 13/00*    (2006.01)
*G10L 13/033*    (2013.01)
*G09B 21/00*    (2006.01)
*G10L 13/04*    (2013.01)
*G10L 13/08*    (2013.01)

(52) U.S. Cl.
CPC .......... *G10L 13/0335* (2013.01); *G09B 21/006* (2013.01); *G10L 13/033* (2013.01); *G10L 13/043* (2013.01); *G10L 13/08* (2013.01); *G10L 2013/083* (2013.01)

(58) Field of Classification Search
USPC ................................ 704/258–260, 270–271
See application file for complete search history.

(56) References Cited

U.S. PATENT DOCUMENTS

| 6,115,482    | A  * | 9/2000  | Sears et al. ................... 382/114 |
| 6,161,093    | A  * | 12/2000 | Watari et al. .................. 704/270 |
| 6,564,186    | B1 * | 5/2003  | Kiraly et al. .................. 704/260 |
| 7,194,411    | B2 * | 3/2007  | Slotznick et al. ............. 704/271 |
| 2002/0178007 | A1 * | 11/2002 | Slotznick et al. ........... 704/270.1 |
| 2003/0078780 | A1 * | 4/2003  | Kochanski et al. ........... 704/258 |

* cited by examiner

*Primary Examiner* — Leonard Saint Cyr
(74) *Attorney, Agent, or Firm* — Andriy Lytvyn; Anton J. Hopen; Smith & Hopen, P.A.

(57) ABSTRACT

A screen reader software product for low-vision users, the software having a reader module collecting textual and non-textual display information generated by a web browser or word processor. Font styling, interface layout information and the like are communicated to the end user by sounds broadcast simultaneously rather than serially with the synthesized speech to improve the speed and efficiency in which information may be digested by the end user.

16 Claims, 10 Drawing Sheets

SCREEN READER HAVING CONCURRENT COMMUNICATION OF NON-TEXTUAL INFORMATION

PRIORITY CLAIM

This application is a continuation of U.S. Nonprovisional patent application Ser. No. 10/710,910 filed Aug. 12, 2004, which claims priority to U.S. Provisional Patent Application No. 60/496,057 filed Aug. 14, 2003 entitled "Screen reader having a user definable auditory interface."

BACKGROUND OF THE INVENTION

Personal computers and the Internet greatly enhanced communications and access to information from around the world. Typically, visual information is displayed upon a monitor screen and data can be added or manipulated via keystrokes upon an associated keyboard. Feedback is provided visually to the user by the monitor screen. Blind users cannot utilize the information appearing upon the monitor screen while visually impaired users may experience difficulty doing so. Accordingly, screen readers have been developed to assist blind and visually impaired users when they use a personal computer.

One such screen reader is JAWS® for Windows.

When installed upon a personal computer, JAWS® provides access to the operating system, software applications and the Internet. JAWS® includes a speech synthesizer that cooperates with the sound card in the personal computer to read aloud information appearing upon the computer monitor screen or that is derived through communicating directly with the application or operating system. Thus, JAWS® provides access to a wide variety of information, education and job related applications. Additionally, JAWS® includes an interface that can provide output to refreshable Braille displays. Current JAWS® software supports all standard Windows® applications, including Microsoft Office XP®. JAWS® has two cursors available to assist the user when he is using a Windows® application, the PC Cursor and the JAWS Cursor. The PC Cursor is linked to the keyboard functions of Windows® applications and used when typing information, moving through options in dialog boxes and making a selection of a particular option. Thus, as each key is pressed JAWS® causes the speech synthesizer to recite the letter corresponding to the key or the name of the selected option. The JAWS Cursor is linked to mouse pointer functions in Windows® applications to provide access to information in an application window that is beyond the scope of the PC Cursor. As an example of the JAWS Cursor, as the user maneuvers the mouse pointer over a tool bar, JAWS® causes the speech synthesizer to recite the name of the particular toolbar button that the pointer is over.

Additionally, JAWS® supports Internet Explorer with special features, such as, links lists, frame lists, forms mode and reading of HTML labels and graphic labels included on web pages. Upon entering an HTML document via an Internet link, JAWS® actuates a Virtual PC Cursor that mimics the functions of the PC cursor. The Virtual PC cursor causes JAWS® to signal the speech synthesizer to speak the number of frames in a document being read in Internet Explorer and the number of links in the frame currently being displayed. Also, JAWS® causes the speech synthesizer to read graphics labeled by alternate tags in HTML code.

Typically, such prior art speech readers have presented information to the user serially. This requires that the user wait for some of the data to be processed. However, it is known that the human brain can process multiple simultaneous information sources. Accordingly, it would be desirable to provide a screen reader that could deliver information for multiple sources simultaneously to reduce data processing time.

Various objects and advantages of this invention will become apparent to those skilled in the art from the following detailed description of the preferred embodiment, when read in light of the accompanying drawing.

SUMMARY OF INVENTION

The present invention is a screen reader software application. A typical use would be to read documents through a word processor or read web pages from a web browser. The screen reader software also provides information relating to the graphic user interface (GUI) and the menu selections available to the end user.

A reader module is communicatively coupled with resident software on a computer. The resident software may include both third party applications running concurrently with the screen reader software as well as the operating system itself. The reader module collects textual and non-textual display information generated by the resident software. The textual information is the alphanumeric characters that are read aloud to the user through a speech synthesizer and/or sent to a tactile Braille display. The non-textual display information may include, but is not limited to, font format, paragraph format, bulleting, numbering, borders, shading, column format, page breaks, section breaks, tab settings, table structure, image data, case settings, comment field locations, hyperlink settings, data entry forms, and graphic user interface configuration.

A broadcast module is communicatively coupled to the reader module. The broadcast module communicates the display information collected by the reader module to an output device. The output device is typically a speech synthesizer or a tactile Braille display. However, alternative devices are contemplated such as vibratory, temperature, visual or any other sensory device. For example, with low-vision users who can see images to a limited degree may detectable colors or shapes that appear on a computer display monitor in association with non-textual display information. The broadcast module includes controls and logic to determine what display information is sent to the output device as well as how it presented to the user through the output device.

The end-user-definable schema may modify the broadcast of textual display information played through the speech synthesizer to communicate the non-textual display information by altering characteristics of the speech synthesizer. The characteristics include, but are not limited to, pitch, speed, volume, emphasis, simulated gender, simulated accent, simulated age, and pronunciation.

In another embodiment of the invention, the schema module includes at least one additional audio output layer to the broadcast of the textual display information to audibly communicate the non-textual display information in substantially concurrent fashion with the synthesized text. The audio output layers are analogous to tracks in a sound track. The synthesized voice plays on the first track while the second track contains sounds played at the same time. Instead of background music played under the dialog between two actors, pre-selected sounds associated with the non-textual display information are played in concert with the applicable textual information that is voice synthesized. The non-textual display information sounds may be dynamically generated by the screen reader application or may be prerecorded digital audio, such as a WAV file. If there are multiple arrays of non-textual display information that apply to a single voice synthesized loop, then a plurality of additional audio output layers (i.e., tracks) may be concurrently broadcast with the synthesized text.

While speech synthesis may be dynamically modified to change pitch, speed, volume, emphasis, simulated gender, simulated accent, simulated age, and pronunciation, Braille display modifications are more limited. However, non-textual information may be communicated through a Braille display by altering the speed at which the pins move. In addition, it is anticipated that emphasis or de-emphasis may be achieved in a Braille display by modifying the distance or level by which pins protrude or retract from the surface of the Braille display. In addition, Braille displays, particularly those operated by bi-morphs mechanisms may be set to vibrate one or more individuals pins to provide non-textual emphasis.

While a single Braille display may be used, two Braille displays may also be deployed. A first Braille display outputs textual display information and a second Braille display outputs non-textual display information in substantially concurrent fashion. Furthermore, a speech synthesizer may be combined with a Braille display wherein the speech synthesizer audibly broadcasts textual display information and the Braille display tactically outputs non-textual display information. This may also be reversed wherein the Braille display outputs the textual information and the speech synthesizer (or simply the audio output of the computer) broadcasts the non-textual information.

It should be noted that a plurality end-user schema definitions are assignable to specific resident software applications whereby the collection aural tags and logic applied to the underlying operating system may be different to the aural tags applied to a web browser. It is also anticipated that end-user schema definitions generated by an end user are shareable with other users.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Blind people access information on computers using either an auditory or a tactile user interface while visually impaired people also may use such interfaces. Auditory user interfaces deliver information to the user through a combination of synthesized or recorded speech and synthesized or recorded tones. Prior to this invention, the visually impaired user had to memorize each of the spoken keywords, sounds, tones and their semantic significance. The present invention contemplates providing a personally customizable interface for a screen reader. Additionally, the user may simultaneously receive multiple signals from the interface to reduce the interface data transmission time.

Figure 1:
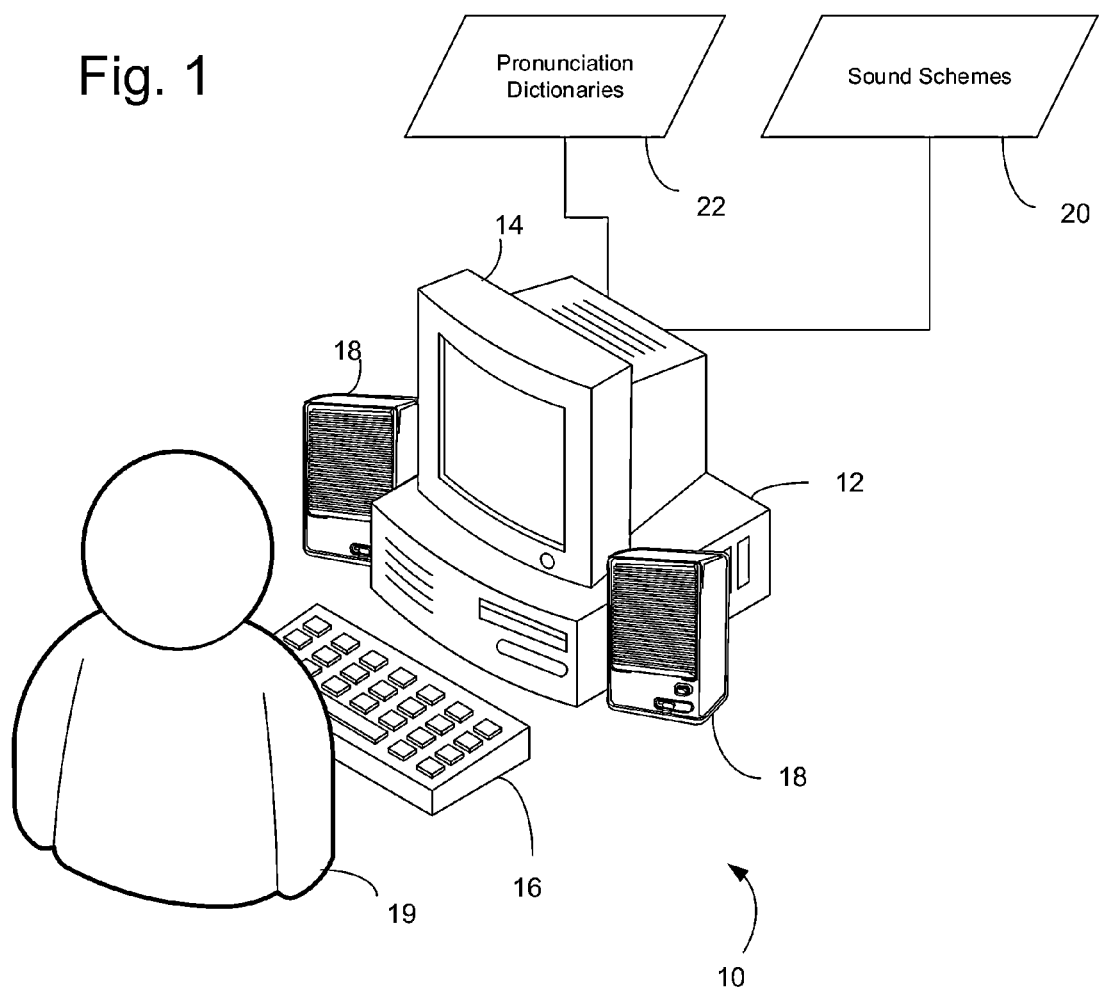
FIG. 1 is an isometric view of computer user in front of a CPU and display monitor with two speakers and links from the CPU to pronunciation dictionaries and sound schemes.

Referring now to the FIG. 1, there is illustrated, at 10, a typical computer work station that includes the present invention. The work station 10 includes a computer 12 having a display monitor 14 and keyboard 16 that is used to communicate with the computer 12.

Additionally, the computer 12 includes a pair of speakers 18 for providing audio signals to the user. The computer 12 is equipped with a screen reader that presents the user with information that would ordinarily appear on the computer's screen or that is derived through communicating directly with the application or operating system. Such information is provided to the user through synthesized or recorded speech, synthesized or recorded sounds and tones, interpreted Musical Instrument Digital Interface (MIDI) sounds and other digital methods of generating sonic information through the speakers 18 attached to the computer. Such systems actually do not require that a video monitor 14 be present as the user is able to gather all information through the auditory user interface.

The present invention contemplates an auditory user interface contained within the personal computer 12 that conveys to the user cultural, contextual, instructional, interactive and informational data. While the figure illustrates an interface contained within a personal computer, it will be appreciated that the invention also may be practiced with a stand alone device (not shown) that may be connected to a data processing device, such as a personal computer. Similarly, the interface can be included in other devices than a personal computer, such as for example, a personal data assistant.

Additionally, the present invention contemplates that multiple items of information are conveyed to the user simultaneously. In order for the user to distinguish between the different types of data presented via the auditory user interface, the invention provides a distinct aural tag for each type of data that may be presented to the user. The aural tags may be a word, sound, pronunciation, tone or any of the other types of sonic information mentioned above, as selected by the user. The tags are associated with triggers contained within the document, such as, for example, certain words, punctuation symbols or normally hidden code, such as HTML symbols. Accordingly, the present invention includes aural tags to convey non-textual aspects of the information being delivered to the user. These aural tags are played simultaneously as the speech reader recites the text. The users brain is capable to detect and interpret the aural tags while simultaneously listing to the textual information. These aural augmentations to the textual information will provide a more complete experience for the user, conveying semantic information that would otherwise be silent in an auditory user interface system. Thus, the computer user is presented information that would ordinarily appear on the computer's screen through synthesized or recorded speech, synthesized or recorded sounds and tones, interpreted MIDI sounds and other digital methods of generating sonic information through speakers attached to the computer.

Prior to this invention, all information in an auditory user interface was presented serially thus requiring the user to wait for some of the data to process. As described above, the present invention delivers textual information through a speech synthesizer as a sound plays simultaneously. This improves the efficiency at which the user can work. In a typical prior art screen reading system using serial data presentation, a user would encounter a radio button and hear, "Yes, radio button selected" which would take the amount of time required for the associated synthesizer to pronounce seven syllables. The present invention permits the user to hear "Yes" while, simultaneously, a sound denoting a radio button in the selected state plays, reducing the time spent to a single syllable while delivering the same amount of data.

Because different computer users will have different needs for auditory information and a single computer user may want to employ different sounds and sets thereof to enhance their ability to perform different tasks, the invention encapsulates a solution for both of these requirements in a single user interface. The interface of the invention includes user definable sound schemes 20 that provide a mechanism in which the user can apply different voices, sounds and other aural augmentations to a set of objects, events, attributes, characters and other items described in the various information types he may encounter. The user can apply a name to his sound scheme and save it for use in the future. The user also may have multiple schemes available to him and may elect to use different schemes in different applications or when trying to accomplish different goals within a single application.

The invention also includes a pronunciation dictionary 22 as a feature of an auditory user interface with which a user can define a specific pronunciation for a character, word or phrase that may be delivered to them by the system that implements the user interface. In this invention, the notion of the pronunciation has been broadened to include the ability to add cultural information to the pronunciation of a character, word or phrase and to enable the user to replace a character, word or phrase with a sound or other non-synthesized aural element. The user can add the cultural information by telling the system which set of pronunciation rules to follow when the specified character, word or phrase is encountered. This may be easily accomplished by selecting from a list contained within the interface. For example, a user who primarily listens to English synthesized speech may instruct the system to pronounce the name of his friend "Wolfgang" using German rules for pronunciation. The same user may want to hear the word "Havana" pronounced using the rules for Latin American Spanish and "Sao Paolo" using the rules for Brazilian Portuguese.

This invention provides the facility that a user can employ to perform this task. Examples of the application of the present invention to different types of data that is encountered while using a personal computer will now be given. The first type of data is informational data which is the contents of a document, Internet web site or some other textual presentation used primarily for the purpose of conveying ideas to the user.

Informational data can typically be delivered using synthesized speech alone. However, the present invention adds other aural tags to convey non-textual aspects of the information being delivered to the user. For instance, a specific tone may be played at the end of each paragraph; different tones might be played to represent each separate punctuation mark; the phrase "all caps" may be spoken before a word that is written using ALL capital letters; the pitch of the synthesized voice may change depending upon the color or size of the text. These aural augmentations to the textual information will provide a more complete experience for the user, conveying semantic information that would otherwise be silent in an auditory user interface system. Additionally, the tone of the speech may be changed while the speech is read to indicate text changes, such as italicized text or quotes. Another type of data is interactive data is information upon which the user can or must take action. Interactive data is used to convey to the user what actions he needs to take in order to perform a task on the computer. In an auditory user interface, different types of objects upon which the user needs to interact (buttons, radio buttons, combo boxes, menus, sliders, check boxes, etc.) need to be identified to the user by their type in order that the user may understand how to act upon the object. Identifying the control type in an auditory user interface may be done in a variety of ways. For example, when the user encounters a check box, the interface can speak the text "check box" or it can play a sound that represents a check box to the user. A more complex example is that of the menu item control where the interface must tell the user the name of the menu item and whether or not it is active. This may be done for a case of a menu item called copy, which was currently active by speaking the text "copy active". In the case of a menu item called copy, which was currently inactive, the interface also could play two tones, one representing the common function "copy" and another tone representing the state "inactive". Alternately, the interface may be configured to combine text and tones to deliver this semantically significant information to the user.

A third type of data that is encountered is instructional data that provides the user with information that describes what actions he may take when he is presented with interactive data. For example, a user who needs to interact with a button type control may be told, by the auditory user interface, "Press ENTER to activate this button or TAB to move on to the next control." The interface might also play a sound that signifies the action a user must take in order to activate a particular control.

Yet another type of data is contextual data that provides the user with information about the relationships between the currently active items in a computer application to other items within the program. For example, an auditory user interface may recite, "Page two of 12", when a user reading a document crosses a page boundary. Equivalently, the auditory user interface may play a tone or sound that signifies crossing page boundaries when the user encounters that same event.

A last type of data is cultural data that is information that augments other types of data by pronouncing the text it speaks using the pronunciation rules of a specific language. The word "once" is pronounced "Wuns" in English, "own thay" in Castilian Spanish and "own say" in Latin American Spanish. While the meaning of the word is the same in the two Spanish dialects, the cultural norms require that the word is pronounced differently. The auditory user interface can take these cultural norms into account and pronounce words in a manner appropriate for the user and the task at hand.

While the preferred embodiment of the invention has been illustrated and described above in terms of an auditory interface, it will be appreciated that the invention also may be practiced utilizing other types of interfaces. For example, the interface may be used in conjunction with a tactile user interface, such as a Braille reader device. The text would supplied to the tactile user interface device while being supplemented with simultaneous auditory sounds as described above. Alternately, the auditory signals could be provided to the user through the tactile user interface while the text is simultaneously read through a speech synthesizer. Furthermore, the invention contemplates providing two tactile user interfaces with one providing the text while the other simultaneously provides the signals.

Such an embodiment would provide silent communication. Alternately, a vibratory device could be used in place of a tactile user interface to signal the user, with different frequencies assigned to different signals. The invention also contemplates using other similar devices to signal the user simultaneous with the other communication. The principle and mode of operation of this invention have been explained and illustrated in its preferred embodiment. However, it must be understood that this invention may be practiced otherwise than as specifically explained and illustrated without departing from its spirit or scope. For example, while the preferred embodiment has been illustrated and described with reference to use with personal computers, it will be appreciated the invention also may be practiced with other similar devices, such as, for example, PAC Mate, a personal data assistant for the visually impaired.

Figure 2:
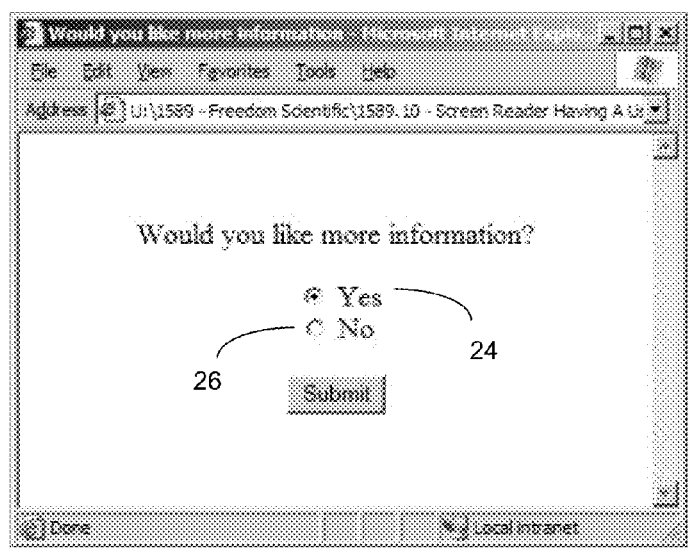
FIG. 2 is a screen shot of a web page with two radio buttons for "yes" or "no" to a question. The "yes" radio button is in a selected state and the "no" radio button is in an unselected state.
Figure 3:
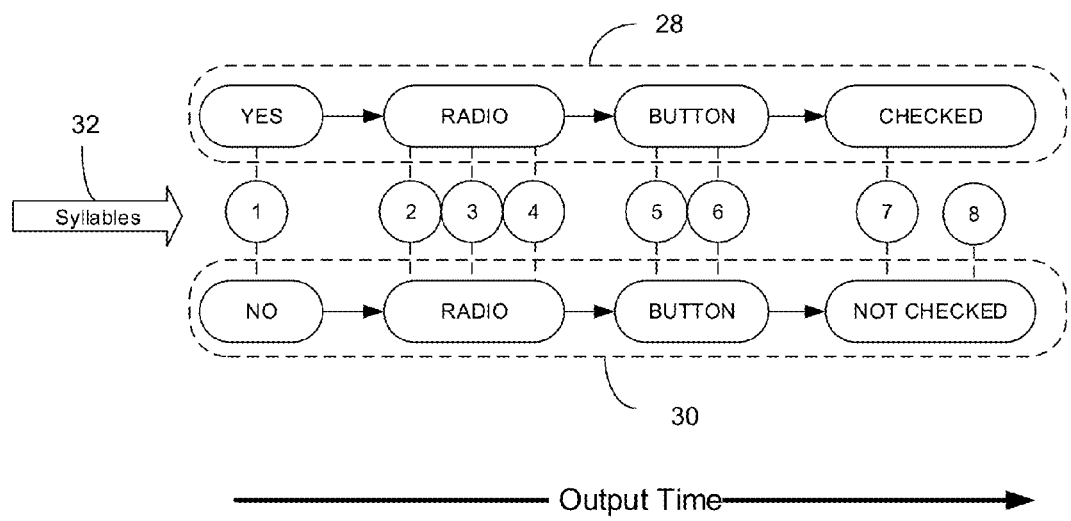
FIG. 3 is a diagrammatic view of the speech output for the screen shot of FIG. 2 showing the number of syllables required to communicate the description and state of the "yes" radio button and the "no" radio button.

Turning back to the figures, in FIG. 2 is a screen shot of a web page with two radio buttons for "yes" or "no" to a question. Radio button for yes value 24 and radio button for no value 26. Radio button 24 is in a selected state and radio button 26 is in an unselected state. In FIG. 3, a count of syllables 32 is provided for the phrase typically required to communicate the description and state of radio buttons 24 and 26. Output phrase 28 for 'yes' value of radio button 24 requires seven syllables. Output phrase 30 for 'no' value of radio button 26 requires eight syllables.

Figure 4:
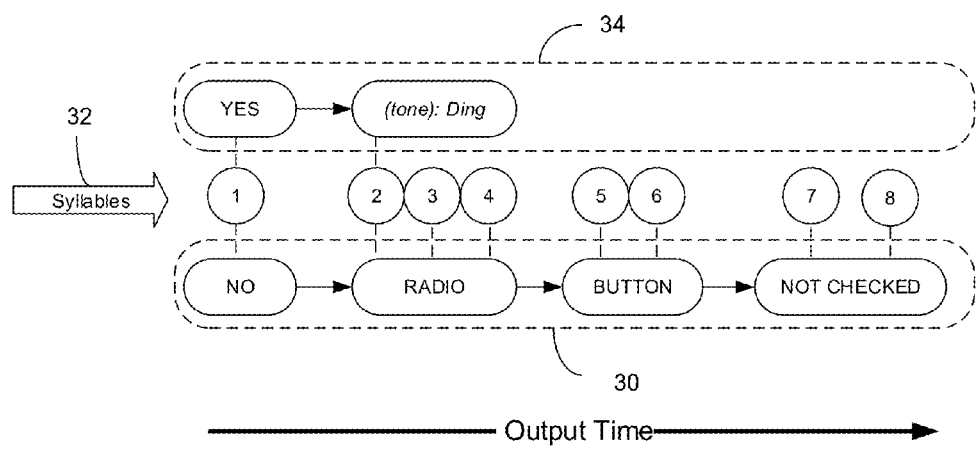
FIG. 4 is a diagrammatic view of an aural tag replacing a speech stream for the "yes" radio button in serial fashion to communicate that the "yes" radio button is selected. The number of syllables needed to communicate the identity and state of the "yes" button is reduced from seven to two.
Figure 5:
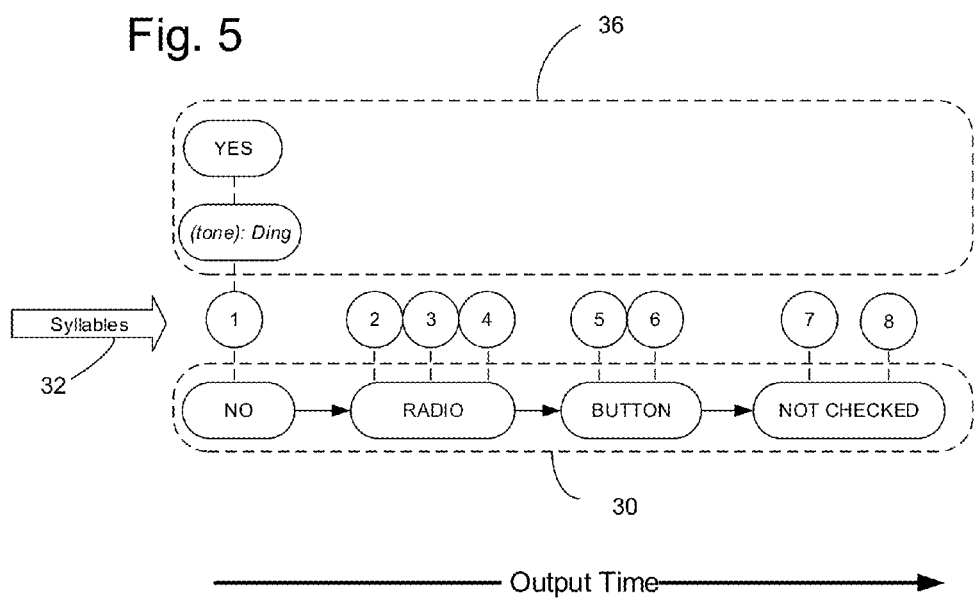
FIG. 5 is a diagrammatic view of an aural tag played concurrently with a synthesized speech output thus reducing the number of syllables from seven to one for the "yes" radio button identification.
Figure 6:
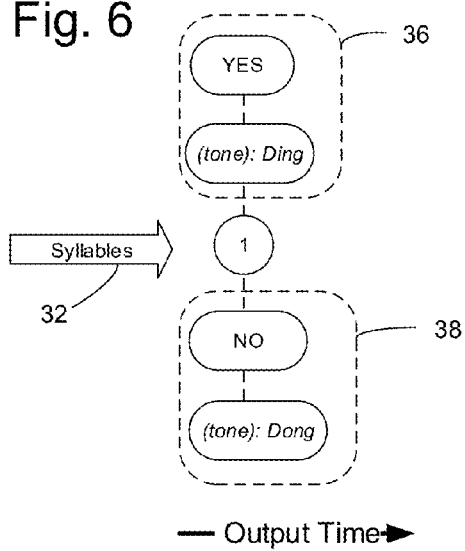
FIG. 6 is a diagrammatic view of aural tags played concurrently with a synthesized speech output for both "yes" and "no" radio buttons. The aural tag for the "yes" button is a "ding" which indicates that the button is selected while the aural tag for the "no" button is a "dong" which communicates that the "no" button is unselected.

In FIG. 4, output phrase 34 is generated with a serial tone 'ding' for the yes value of the radio button. The 'ding' sound communicates to the user that the radio button is in a selected state. If the 'ding' is counted as a syllable, the total syllable count 32 for phrase 34 is five less than from equivalent phrase 28. However, many users have the auditory and cognitive ability to assimilate an influx or more information that the serial nature of phrases 28 and 34. In FIG. 5, output phrase 36 provides a concurrent tone for the 'yes' value of the radio button. The 'ding' sound is played concurrently with the synthesized voice output. Thus, syllable count 32 is reduced to one. In FIG. 6, output phrase 38 is provided by the 'no' value of radio button 26 wherein a lower-pitch 'dong' sound is broadcast concurrently with the voice synthesized output for the word 'no.' Of course, if the radio button 26 was selected for the 'no' value, then the voice synthesizer would broadcast 'no' concurrently with a 'ding' sound to indicated that 'no' is the selected value.

Figure 7:
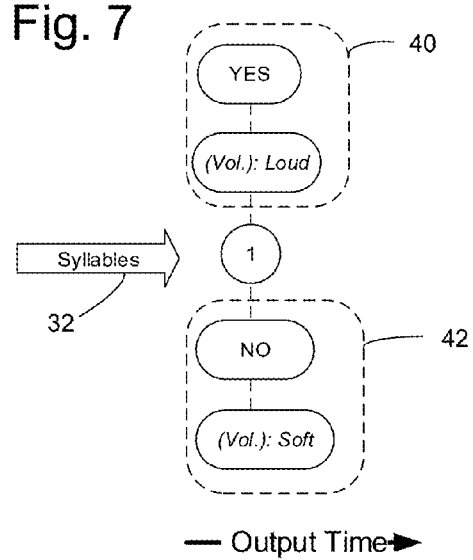
FIG. 7 is a diagrammatic view of modifying synthesized speech output for both "yes" and "no" radio buttons. The modification for the "yes" button is an increase in volume to indicate that the "yes" button is in a selected state while the modification for the "no" button is a reduction in volume to indicate that the "no" button is in an unselected state.

The communication of the non-textual information in FIG. 6, namely, the state of the two radio buttons does not necessarily require a second audio layer or track to send a sound. Pitch, speed, emphasis and the like may be applied to the normal synthesized voice to communicate the non-textual information. For example, in FIG. 7, if the radio button is in a selected state, output phrase 40 for the 'yes' value plays at a higher volume of spoken text while the non-selected 'no' value invokes output phrase 42 having a lower volume of spoke text.

Figure 8:
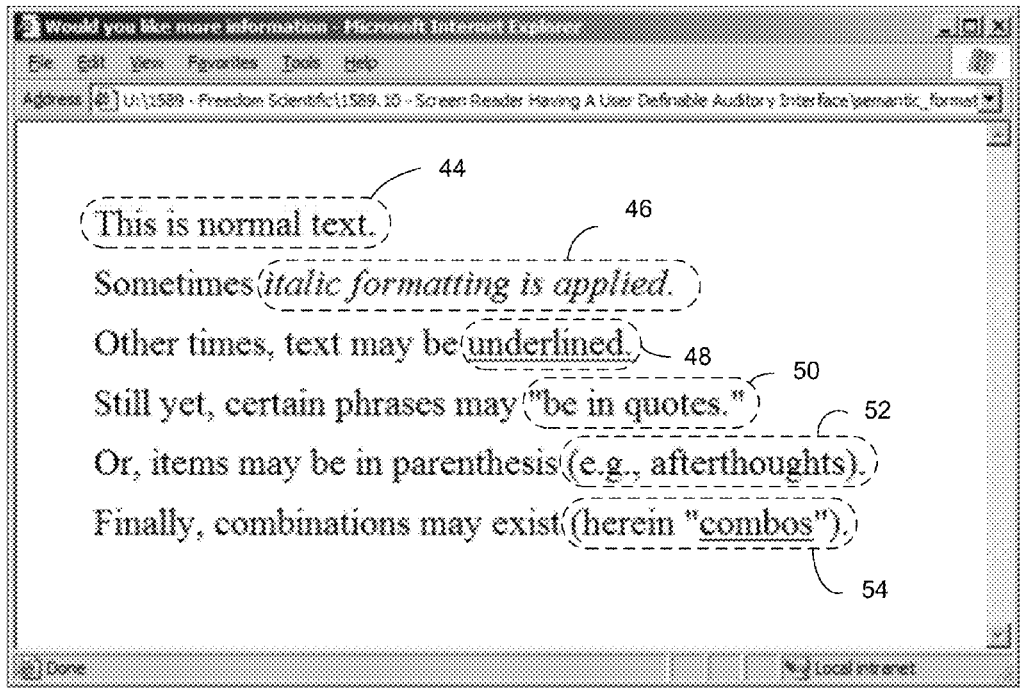
FIG. 8 is a screen shot of a web page with six separate lines of text. The first line of text has no formatting. The second line of text has a portion italicized. The third line of text has a portion underlined. The fourth line of text has a portion in quotes. The fifth line of text has a portion in parenthesis. The sixth and final line of text has a portion that is in parenthesis, quotes and underlined at the same time.
Figure 9:
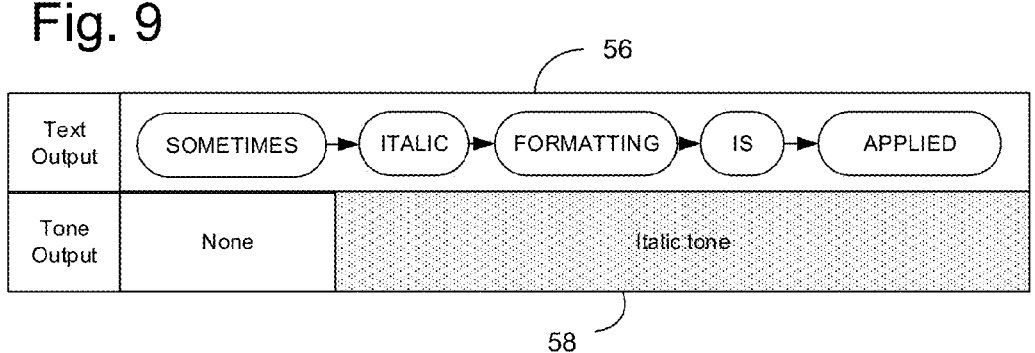
FIG. 9 is a diagrammatic view of an audio output stream for the second line of FIG. 8 having italicized text.
Figure 10:
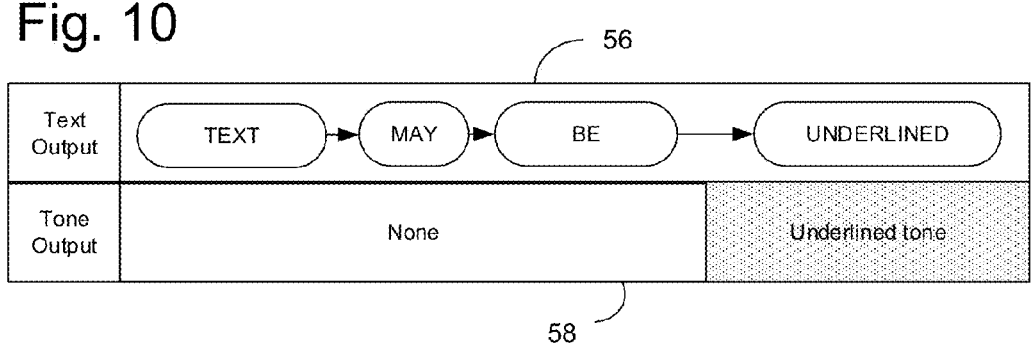
FIG. 10 is a diagrammatic view of an audio output stream for the third line of FIG. 8 having underlined text.
Figure 11:
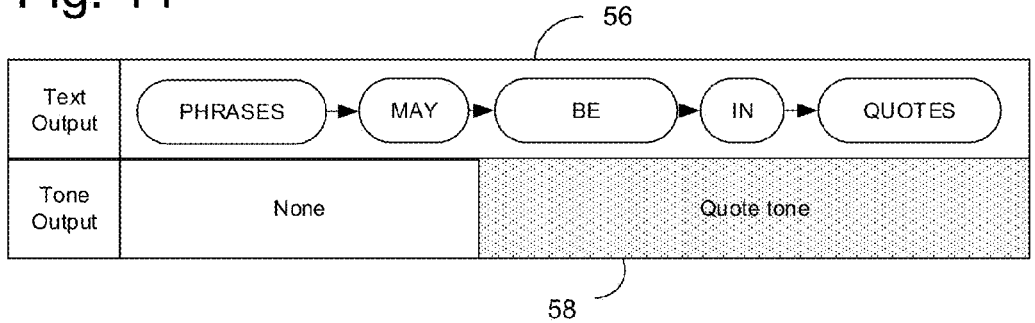
FIG. 11 is a diagrammatic view of an audio output stream for the fourth line of FIG. 8 having text in quotes.
Figure 12:
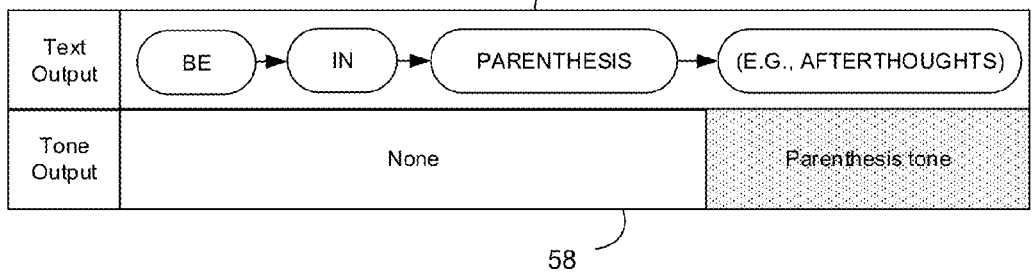
FIG. 12 is a diagrammatic view of an audio output stream for the fifth line of FIG. 8 having text in parenthesis.
Figure 13:
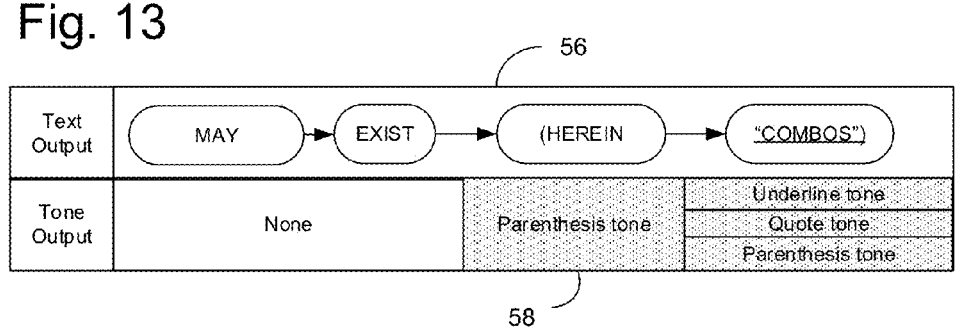
FIG. 13 is a diagrammatic view of an audio output stream for the sixth line of FIG. 8 having text which is simultaneously underlined, in quotes and in parenthesis.

In addition to form elements such as radio buttons, non-textual information may include the font, punctuation and sentence structure. FIG. 8 shows a web page with six separate lines of text. First line 44 of text has no formatting. Second line 46 of text has a portion italicized. Third line 48 of text has a portion underlined. Fourth line 50 of text has a portion in quotes. Fifth line 52 of text has a portion in parenthesis. Sixth and final line 54 of text has a portion that is in parenthesis, quotes and underlined at the same time. In FIG. 9, text output track 56 broadcasts the phrase 'sometimes italic formatting is applied.' Tone output track 58 generates a tone representative of an italic font styling only while the italicized words are spoken by the speech synthesizer. In FIG. 10, tone output track 58 generates a tone representative of an underlined font styling only while the underlined words are spoken by the speech synthesizer. In FIG. 11, tone output track 58 generates a tone representative of a quoted text string only while the quoted words are spoken by the speech synthesizer. In FIG. 12, tone output track 58 generates a tone representative of a text string within parenthesis only while the words within parenthesis are spoken by the speech synthesizer. In FIG. 13, tone output track 58 generates multiple tones representative of an underlined, quoted text string within parenthesis only while the underlined, quoted words within parenthesis are spoken by the speech synthesizer. The amount of aural information provided to the user is limited by the auditory and cognitive capabilities of the user.

Figure 14:
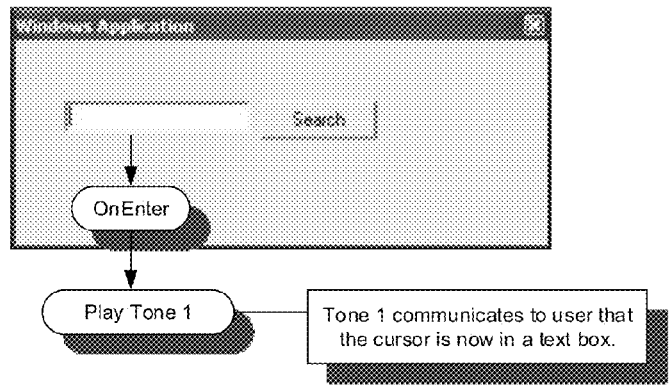
FIG. 14 is a screen shot of a dialog box having a single text entry form and an enabled button. A diagrammatic flow chart indicates how an embodiment of the present invention communicates the objects and their state to the end user.
Figure 15:
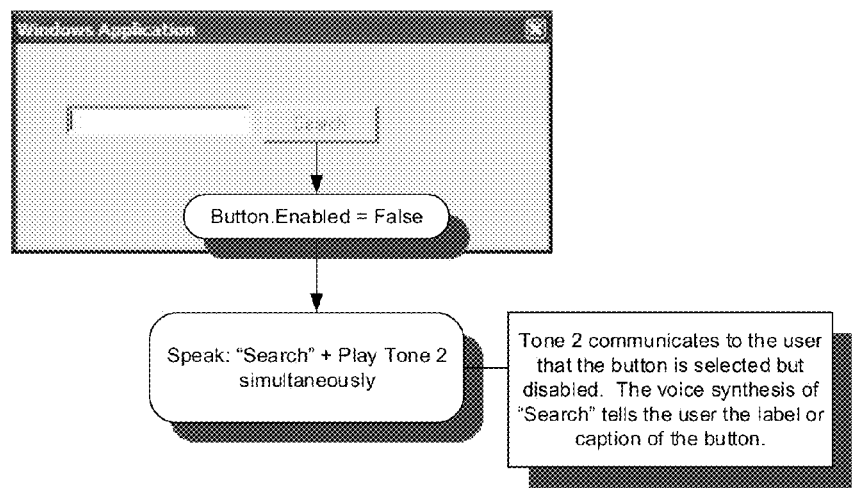
FIG. 15 is a screen shot of a dialog box having a single text entry form and a disabled button. A diagrammatic flow chart indicates how an embodiment of the present invention communicates the identity of the objects and corresponding state of each object to the end user.

FIG. 14 is a dialog box having a single text entry form and an enabled button. Upon a cursor entering the text entry form an API event at the operating system level is detected by the software and Tone 1 is played to communicate to the user that the cursor is now in a text box. In FIG. 15, the button captioned 'Search' is disabled. The software simultaneously synthesizes and broadcasts the word 'Search' while playing Tone 2. Tone 2 communicates to the user that the button is selected by disabled.

Figure 16:
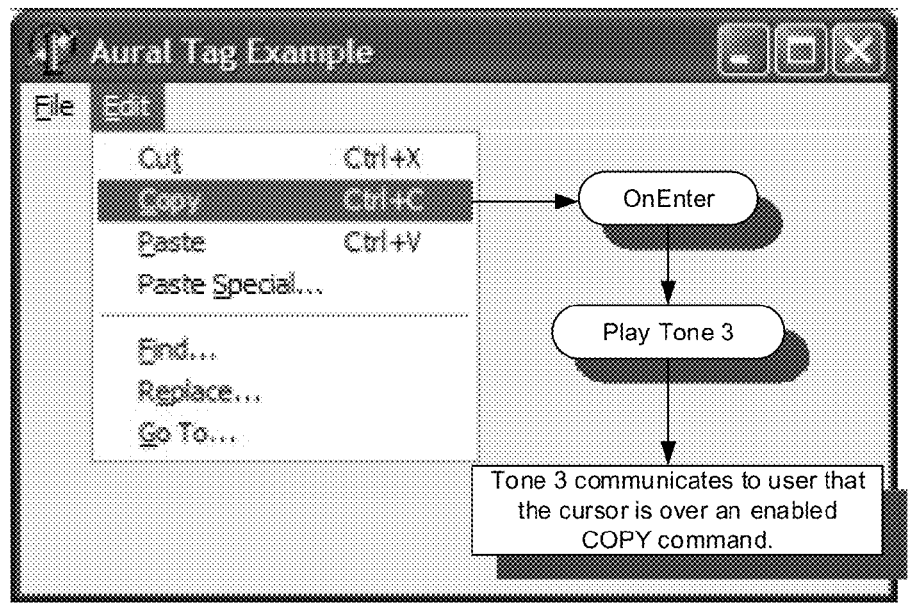
FIG. 16 is a screen shot of a dialog box having a drop-down edit menu with the COPY command selected. A diagrammatic flow chart indicates how an embodiment of the present invention communicates that the COPY command is selected.
Figure 17:
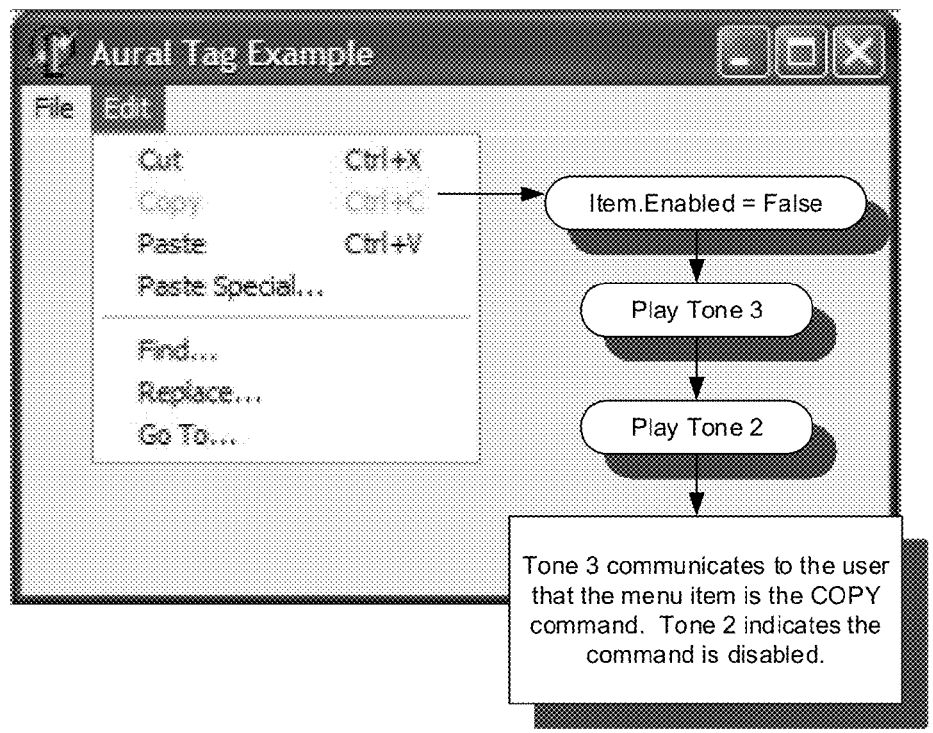
FIG. 17 is a screen shot of a dialog box having a drop-down edit menu with the COPY command disabled. A diagrammatic flow chart indicates how an embodiment of the present invention communicates the identity of the COPY menu item and that its state is disabled.

Some commands that common across an operating system or a well known software application may be reduced to a short sound. For example, in FIG. 16, high-lighting the COPY command fires an event to play Tone 3. Tone 3 communicates to the user that the cursor is over a COPY command. As opposed to the method in FIG. 15 wherein the caption of the button is spoken, the COPY command is ubiquitous within most modern operating systems. Therefore a short sound may suffice for the user. In many operating system, certain menu items and buttons may be enabled or disabled according to the program logic of the software application. This assists the user in determining which options are available to him or her under the current state of the application. In FIG. 17, the COPY command is disabled. Tone 3 is played to indicate the COPY command is selected but is followed by Tone 2 which is a common tone for any menu item or button that is in a disable state.

Figure 18:
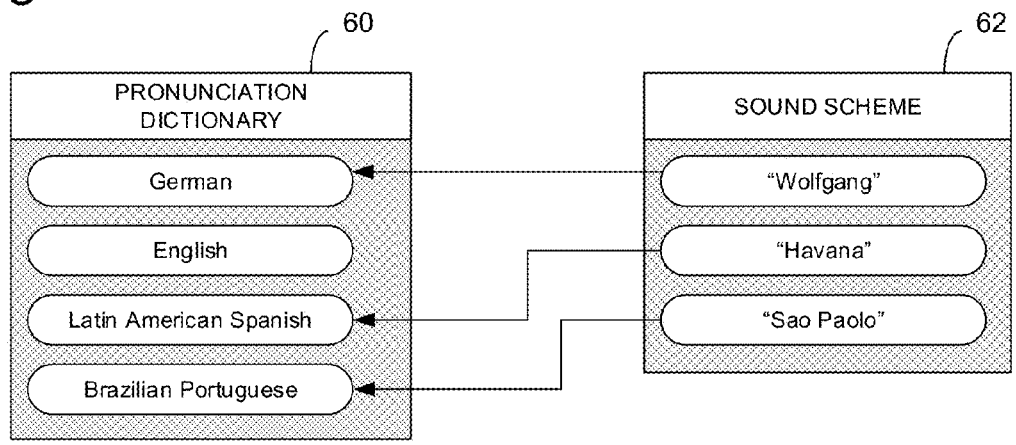
FIG. 18 is a diagrammatic view of a sound scheme linked to a pronunciation dictionary for pronouncing preselected words under different language rules.
Figure 19:
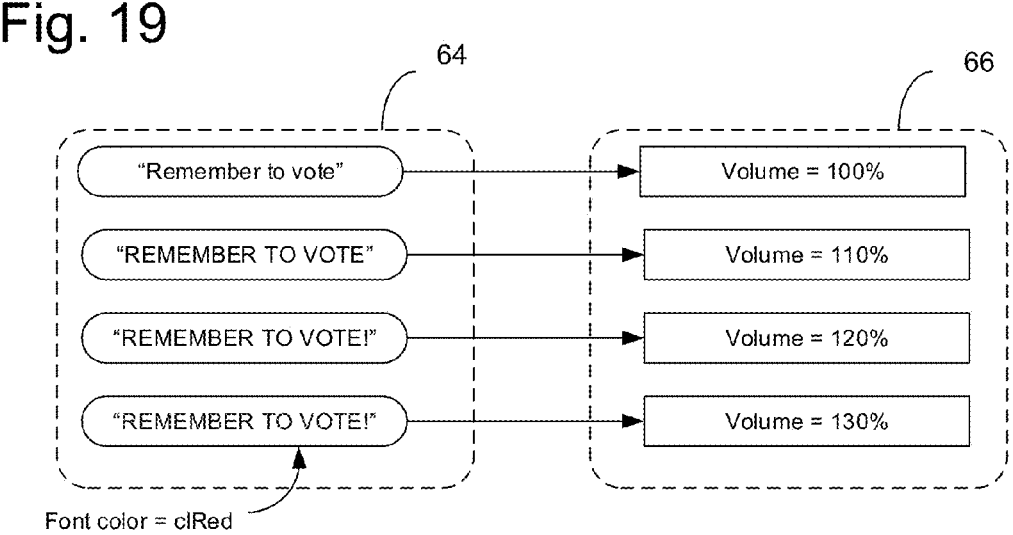
FIG. 19 is a diagrammatic view of various audio output handling of a phrase in lower case, upper case, upper case with an exclamation point and upper case with an exclamation point in red font styling.

In FIG. 18 sound scheme 62 is linked to pronunciation dictionary 60 for pronouncing pre-selected words under different language rules as described earlier in the specification. Various audio output handling of a common phrase is illustrated in FIG. 19. 'Remember to vote' is provided in lower case, upper case, upper case with an exclamation point and upper case with an exclamation point in red font styling. Each one of these iterations makes an impact on the visual reader of the text. However, without non-textual interpretation, the low-vision or blind reader does not sense of the impact. One method is to logically adjust the audio output properties of the speech synthesizer. Where the phrase is displayed in normal sentence case, the volume is set to 100%. When the phrase is set to all capital letters, then the volume is increased to 110%. This is particularly appropriate for reading email as a general understanding exists that words in all capital letters are considered shouted. The present invention also anticipates not only using capitalization to adjust the audio output, but other attributes as well. For example, volume is increased to 120% in the invent that an exclamation point exists at the end of the sentence string. The volume may even be gradually increased as the end of the sentence is spoken by the speech synthesizer. Finally, font styling, in this case, coloring the font red, would increase the volume to 130% as red is logically associated with urgency. However, it is important to note that the sound schema is preferably adjustable by the end user to meet his or her personal preferences the cultural norms of his or her background.

Figure 20:
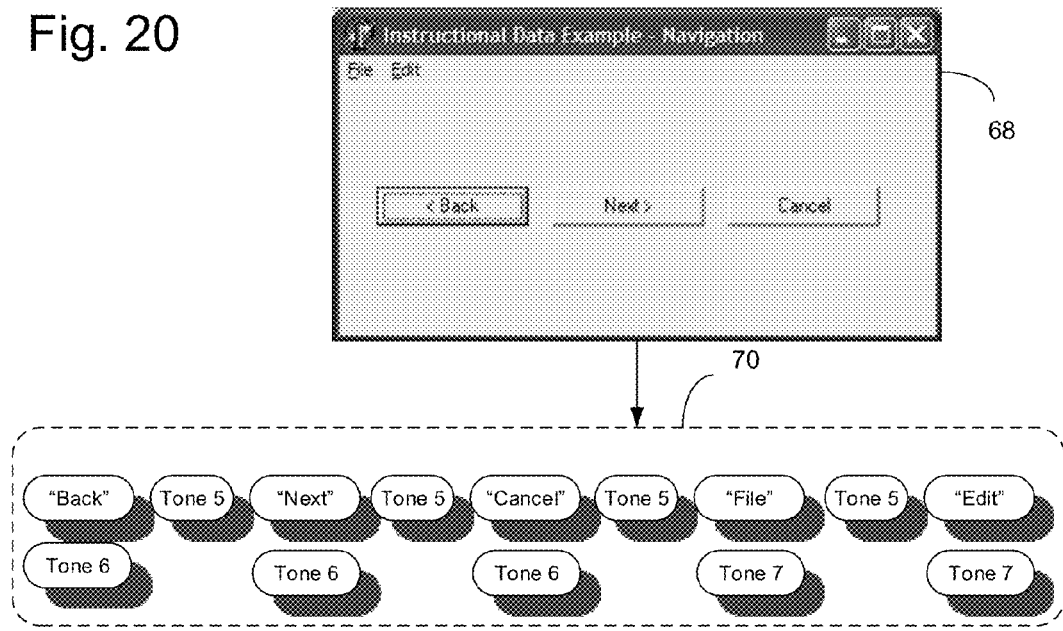
FIG. 20 is a screen shot of a dialog box having two drop-down menus and three push buttons. A diagrammatic flow chart indicates how an embodiment of the present invention communicates the identity of the objects, the type of each object and the navigation options for moving to each object.

In FIG. 20, concurrent and sequential tones are used to communicate the tabbed-navigation of dialog box 68 having a two drop-down menus and three push buttons. The three buttons are captioned 'Back,' 'Next' and 'Cancel.' The two drop-down menus are captioned 'File' and 'Edit." Aural output for dialog box 68 includes speaking the captions of each the buttons concurrently with Tone 6 which indicates the item is a button. The drop-down menu captions are spoke concurrently with Tone 7 which indicates they are drop-down menu objects. Between each button and drop-down menu, Tone 5 is broadcast to indicate that tabbing will navigate the user the next broadcast item.

Figure 21:
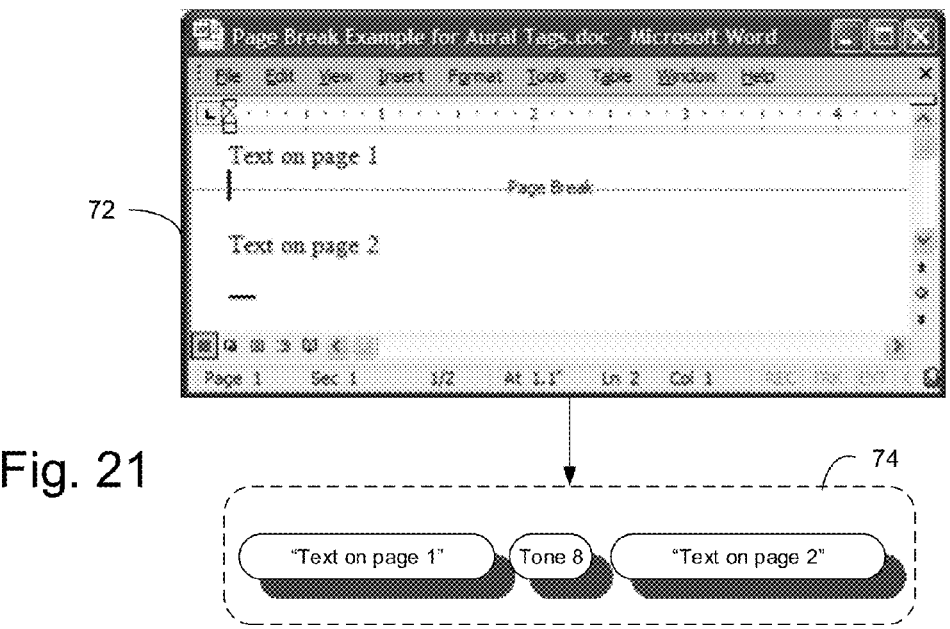
FIG. 21 is a screen shot of a word processor having a sentence before a page break and a sentence after a page break. A diagrammatic flow chart indicates how an embodiment of the present invention communicates the page break to the user between reading sentences on each page.

In FIG. 21, visual display from word processor 72 having a sentence before a page break and a sentence after a page break is communicated by the introduction of page-break Tone 8 between the two sentences.

Figure 22:
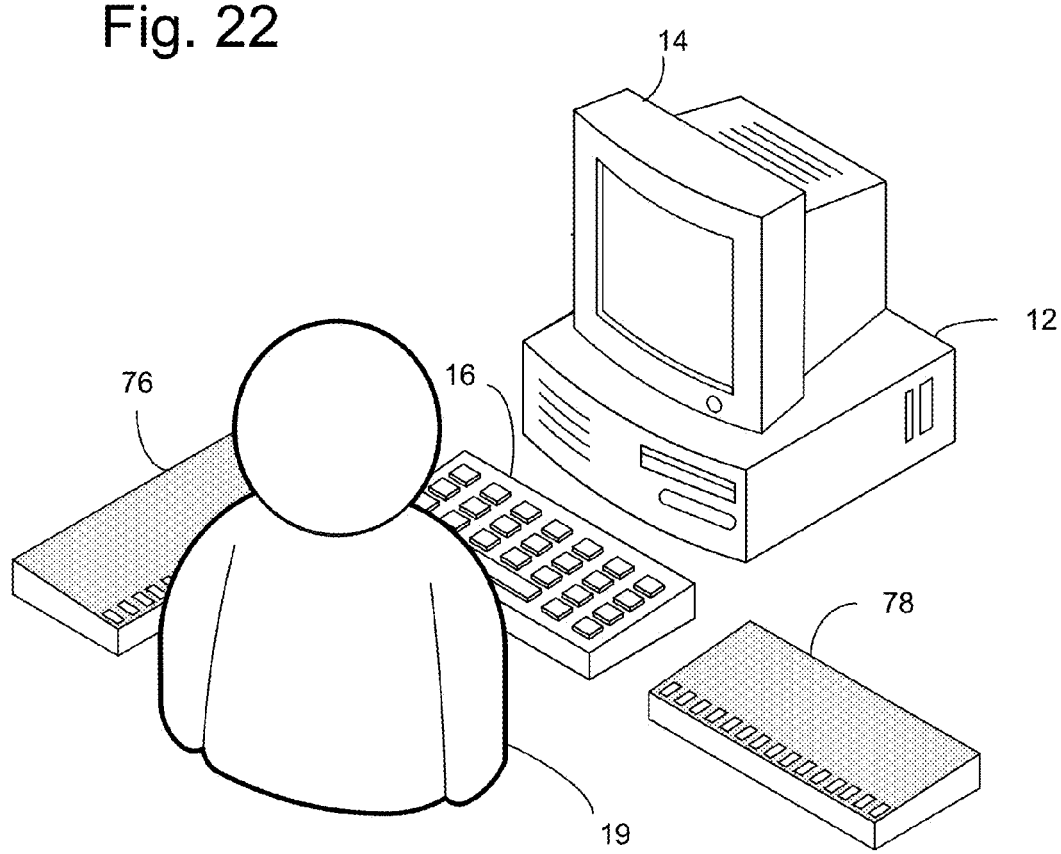
FIG. 22 is an isometric view of computer user in front of a CPU and display monitor with two Braille readers in communication with the CPU.
Figure 23:
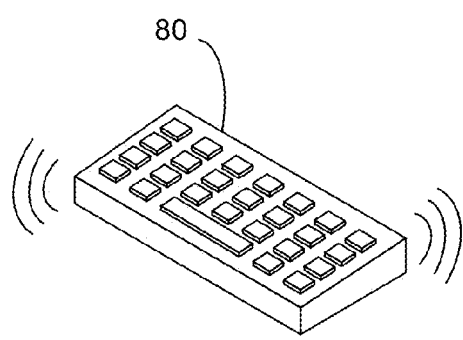
FIG. 23 is an isometric view of a vibratory keyboard adapted for communicating non-textual information to the user.

In FIG. 22, an alternative embodiment of the invention is provided that incorporates first Braille reader 76 to output textual information and second Braille reader 78 to concurrently output related non-textual information. In FIG. 23, a vibratory keyboard is provided wherein non-textual information is communicated to the user by changing the frequency of vibration.

DRAWING REFERENCE NUMERALS

| No. | Description |
|---|---|
| 10 | Invention embodiment |
| 12 | Computer |
| 14 | Display monitor |
| 16 | Keyboard |
| 18 | Speakers |
| 20 | Sound schemes |
| 22 | Pronunciation dictionary |
| 24 | Radio button for yes value |
| 26 | Radio button for no value |
| 28 | Output phrase for 'yes' value of radio button |
| 30 | Output phrase for 'no' value of radio button |
| 32 | Count of syllables |
| 34 | Output phrase with serial tone for 'yes' value of radio button |
| 36 | Output phrase with concurrent tone for 'yes' value of radio button |
| 38 | Output phrase with concurrent tone for 'no' value of radio button |
| 40 | Output phrase with increased volume level for 'yes' value of radio button |
| 42 | Output phrase with decreased volume level for 'no' value of radio button |
| 44 | An example of text without formatting |
| 46 | Italic text |
| 48 | Underlined text |
| 50 | Text in quotes |
| 52 | Text in parenthesis |
| 54 | Text with combined formatting |
| 56 | Text output track |
| 58 | Tone output track |
| 60 | Pronunciation dictionary with four languages |
| 62 | Sound scheme with three foreign pronunciation rules |
| 64 | Array of text in several iterations |
| 66 | Volume adjustments based on text format, capitalization and punctuation |

-continued

| No. | Description |
|---|---|
| 68 | Software application dialog box with three buttons and two menu items |
| 70 | Aural output for dialog box 68 |
| 72 | Word processor showing page break between two sentences. |
| 74 | Aural output for word processor application 72. |
| 76 | First Braille reader |
| 78 | Second Braille reader |
| 80 | Vibratory keyboard |

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A non-transitory computer-readable medium having stored thereon computer-executable instructions that, in response to being executed by a computing device, cause the computing device to perform operations comprising:
   collecting a plurality of alphanumerical characters generated by a resident software;
   collecting non-textual display information associated with each collected alphanumerical character, wherein the associated non-textual display information is selected from the group consisting of font styling, punctuation marks, paragraph format, bulleting, numbering, borders, shading, column format, page breaks, section breaks, tab settings, table structure, image data, case settings, comment field locations, hyperlink settings, data entry forms, and graphic user interface configuration;
   electronically transmitting the plurality of alphanumerical characters to an output device speech synthesizer; and
   electronically transmitting the associated non-textual display information substantially contemporaneously with the plurality of alphanumeric characters to the output device speech synthesizer, whereby an audible broadcast of the plurality alphanumeric characters is modified to audibly output the associated non-textual display information by altering characteristics of the speech synthesizer, the characteristics selected from the group consisting of pitch, speed, volume, emphasis, simulated gender, simulated accent, simulated age, and pronunciation.

2. The non-transitory computer-readable medium according to claim 1, wherein the font styling is selected from the group consisting of color, underlining, italicization, bolding, text font, and text size.

3. The non-transitory computer readable storage medium according to claim 1, wherein the broadcast of the textual display information is modified according to a set of predefined or user-defined rules.

4. The non-transitory computer readable storage medium according to claim 1, further comprising communicating the textual display information and the associated non-textual display information to a Braille display.

5. The non-transitory computer readable storage medium according to claim 4, wherein the broadcast of the textual display information is modified to communicate the non-textual display information by altering tactile characteristics of the Braille display.

6. The non-transitory computer readable storage medium according to claim 5, wherein the tactile characteristics of the Braille display are selected from the group consisting of display speed, pin protrusion level, pin refraction level, and pin vibration.

7. The non-transitory computer readable storage medium according to claim 5, further comprising communicating the textual display information to a first Braille display and communicating the associated non-textual display information to a second Braille display, wherein the first Braille display outputs the textual display information and the second Braille display concurrently outputs the non-textual display information tactilely.

8. The non-transitory computer readable storage medium according to claim 1, further comprising communicating the associated non-textual display information to a vibratory apparatus, wherein the vibratory apparatus outputs the associated non-textual display information by vibrating at preselected frequencies.

9. A non-transitory computer-readable medium having stored thereon computer-executable instructions that, in response to being executed by a computing device, cause the computing device to perform operations comprising:
   collecting a plurality of alphanumerical characters generated by a resident software;
   collecting non-textual display information associated with each collected alphanumerical character, wherein the associated non-textual display information is selected from the group consisting of font styling, punctuation marks, paragraph format, bulleting, numbering, borders, shading, column format, page breaks, section breaks, tab settings, table structure, image data, case settings, comment field locations, hyperlink settings, data entry forms, and graphic user interface configuration;
   electronically transmitting the plurality of alphanumerical characters to an output device speech synthesizer; and
   electronically transmitting the associated non-textual display information substantially contemporaneously with the plurality of alphanumeric characters to the output device speech synthesizer, whereby the associated non-textual display information is audibly outputted as a pre-selected sound selected from the group consisting of a dynamically generated sound and a prerecorded digital audio.

10. The non-transitory computer-readable medium according to claim 9, wherein the font styling is selected from the group consisting of color, underlining, italicization, bolding, text font, and text size.

11. The non-transitory computer readable storage medium according to claim 9, wherein the broadcast of the textual display information is modified according to a set of predefined or user-defined rules.

12. The non-transitory computer readable storage medium according to claim 9, further comprising communicating the textual display information and the associated non-textual display information to a Braille display.

13. The non-transitory computer readable storage medium according to claim 12, wherein the broadcast of the textual display information is modified to communicate the non-textual display information by altering tactile characteristics of the Braille display.

14. The non-transitory computer readable storage medium according to claim 13, wherein the tactile characteristics of the Braille display are selected from the group consisting of display speed, pin protrusion level, pin retraction level, and pin vibration.

15. The non-transitory computer readable storage medium according to claim 13, further comprising communicating the textual display information to a first Braille display and communicating the associated non-textual display information to a second Braille display, wherein the first Braille display outputs the textual display information and the second Braille display concurrently outputs the non-textual display information tactilely.

16. The non-transitory computer readable storage medium according to claim 9, further comprising communicating the associated non-textual display information to a vibratory apparatus, wherein the vibratory apparatus outputs the associated non-textual display information by vibrating at pre-selected frequencies.

* * * * *